United States Patent Office 3,248,250
Patented Apr. 26, 1966

3,248,250
COATING AND BONDING COMPOSITION
Glenn A. Collins, Jr., North Wales, Pa., assignor to Teleflex Incorporated, North Wales, Pa., a corporation of Delaware
No Drawing. Filed June 28, 1963, Ser. No. 291,270
4 Claims. (Cl. 106—286)

This invention relates to a high heat and corrosion resistant coating composition and constitutes an improvement in the coating composition covered by concurrently filed United States Patent applications Serial Numbers 291,269, 291,271, 291,289 and 291,248 which are continuations-in-part of the United States patent applications Serial Nos. 166,385, 166,386, and 166,398 all filed January 15, 1962, and all being assigned to the assignee of the present invention Serial Nos. 291,269, 166,385, 166,-386 and 166,398 are now abandoned.

In the aforesaid patent applications there are disclosed coating compositions having high heat and corrosion resistance as well as other desirable properties and comprising a mixture of solid particulate material having a grain size less than 325 mesh in an aqueous solution containing substantial amounts of phosphate ion, metal ion and ions selected from the group consisting of chromate and molybdate. To form the coatings, such composition is applied as by spraying or dipping to the surface to be coated and is then dried and cured to water insolubility, such curing requiring temperatures upward of 500° F. and preferably from about 600° to 800° F.

I have now discovered that if a water soluble metal silicate, preferably sodium silicate is included as an ingredient in the composition, the curing temperature can be reduced to as low as about 250° F. without sacrifice in the quality of the final coating. Briefly, then the preferred compositions of the present inventions comprise a uniform mixture of finely divided solid particulate material in an aqueous solution containing phosphate ion, metal ion, chromate or molybdate ion, and sodium silicate. Further details as well as other advantages and features of the invention will appear more clearly from the following full description of various preferred embodiments thereof.

The phosphate anion concentration should preferably be from 1 to 4 mols per liter though as little as .5 per liter is satisfactory for some applications of the coatings. The phosphate can be introduced into the solution in the form of phosphoric acid, in the form of phosphates of the metal or metals to be included as the metal cation or, as is preferred, it can be added in both forms. It will be understood that the term "phosphate" is intended to comprehend not only the $PO_4$ ion but also the $HPO_4$ and $H_2PO_4$ ions. All three, for example, result from the ionization of $H_3PO_4$ and the hydrogen phosphate ions generally will, at least to some extent, be present in the compositions of this invention. Where phosphoric acid is used as additive in making the compositions, it is much desired to use the ortho acid $H_3PO_4$ though the invention also comprehends the use of the other forms such as the metal or pyro acids all ionizing in water to provide phosphate anion. Examples of metal phosphates which can be used to add phosphate ion are the mono, di and tribasic phosphates of magnesium, zinc, aluminum, iron and lithium. The phosphate used should, of course, be soluble in the solution though this does not mean it must be high water soluble since many of the phosphates not soluble in water are nevertheless soluble in an acid solution, for example, one containing phosphoric acid or chromic acid. In general, however, the mono and dibasic phosphates, which are more soluble than the tribasic salts, are preferred. The chromate ion concentration should be from about .3 to 3 mols per liter, at least .5 mol per liter being preferred. The chromate can be added as chromic acid, or as a metal chromate or dichromate, for example, the chromate or dichromate or magnesium, zinc, aluminum, calcium, barium, lithium, sodium or silver. It it is desired to replace the chromate ion in whole or in part with molybdate ion, molybdic acid or the metal molybdates, for example, zinc molybdate can be used. Chromate ion is, however, preferred. It will be manifest that the chromate may be present in the solution at least in part as the dichromate ion and hence the term "chromate" ion is intended to comprehend both chromate and dichromate; however for purposes of uniformity and simplicity in defining concentration all the chromate is assumed to be present as chromate rather than dichromate though it may in fact be present as the latter.

The metal ion concentration should be from about .2 to 4 mols per liter and, for most uses, at least about 1 mol per liter. Where the phosphate and/or chromate or molybdate ion is furnished to the solution by addition of a metal salt, in accordance with the above, this inherently also supplies metal ion to the solution, hence, any of the aforementioned phosphates, chromate, dichromates or molybdates can be used as the source of metal ion. Additionally, metal ion can be supplied in the form such as metal oxide, hydroxide, carbonate, etc. which will dissolve in acid to produce the metal phosphate, chromate, or molybdate and therefore the metal ion, plus water and/or gas which is evolved. Of course, if the metal ion is added in this form the other solution additions must supply the acidity required to accomplish the acid-base reaction. For example, some of the phosphate ion should be added as phosphoric acid, as is preferred, or some of the chromate as chromic acid. The following metal compounds will illustrate those which can be added to generate the metal ion within the solution in accordance with the above: Magnesium oxide, magnesium hydroxide, zinc hydroxide, aluminum hydroxide, lithium carbonate, calcium hydroxide, calcium carbonate. Of course, it will be understood that the refractory metal oxides which can be used as the solid particulate material in the practice of this invention as hereinafter described, cannot be employed as the metal ion additive since they are difficult if not impossible to dissolve even in the strong acid. It will be manifest that the ion concentrations herein set forth include all of the dissolved material to which reference is made, whether existing in associated or disassociated form.

In general, the valence $+2$ and $+3$ metals are preferred. Magnesium is outstanding though for some specific uses of the compositions, the ferric and aluminum ions which are $+3$ valence, will serve to advantage. While not as good as magnesium, zinc is also desirable. The valence $+1$ metals are satisfactory though for most applications of the coatings it is generally preferable to use them only in combination with valence $+2$ and/or valence $+3$ metals.

For optimum coating properties, a solid particulate material should be included. The solid particulate material should, of course, be insoluble in the solution and hence form a slurry therewith. It can be included in an amount of from 10 to 2000 grams per liter though for most uses from about 300 to 1000 grams per liter will be preferred. Examples of solid particulate materials are the metal powders, such as powdered aluminum, nickel and silver, aluminum being outstandingly advantageous, the refractory oxides, carbides, nitrides, borides and silicides such as aluminum oxide, zirconium oxide, silicon carbide, silicon nitride, boron nitride, tungsten boride, molybdenum disilicide. For lubricative compositions, the solid particulate material will be a dry lubricant such as molybdenum disulfide, tungsten disulfide, graphite or lead oxide. Other particulate materials which can be used are insoluble silicates, such as magnesium silicate and zirconium silicate, calcium fluoride, cadmium fluoride and silica. The particulate material should have a gram size of less than about 200 mesh and preferably no greater than 325 mesh.

To attain a coating with exceptionally good lubricity and flexibility, the organic polymers of high inherent lubricity can be included in place of or in addition to the solid particulate material as described in detail and convered by copending United States patent applications Serial Numbers 291,248 and 291,358 filed concurrently herewith.

In accordance with the present invention, there is added to the solution or slurry, sodium silicate, preferably already dissolved in some water and in an amount of from about 1 to 100 grams per liter of the solution. The precise soda-to-silica ratio is not critical to attainment of the desired results; any of the commercially available water glasses may be used. If desired, the other water soluble alkali metal silicates such as potassium silicate, either along or in admixture with sodium silicate can be used. Also, the sodium silicate or the alkali metal silicate addition can be in combination with small amounts of colloidal gel formers as covered by my United States application Serial No. 291,268 filed concurrently herewith and assigned to the assignee of the present invention. The precise reasons why the soluble substrate effects a reduction in the temperature required to cure the coatings is not fully understood but it is theorized that the silicate chemically enters into the inorganic complex formed during curing by the phosphate, metal and chromate or molybdate ions, such complex forming at a lower temperature with the silicate present than where it is absent. Compositions, formulated in accordance with the invention can be cured at temperatures as low as 250° F. though the preferred curing temperature is from 300° F. to 500° F., a complete curing generally being attainable at such temperature in from 3 to 60 minutes. The precise time and temperature required will of course, depend upon the exact formulation of the coating.

The following specific examples will serve to further illustrate:

*Example 1*

| | |
|---|---|
| $H_3PO_4$ (85% aqueous solution) cc | 200 |
| MgO grams | 50 |
| $Mg(H_2PO_4)_2 \cdot 3H_2O$ do | 50 |
| $MgCr_2O_7 \cdot 6H_2O$ do | 150 |
| Sodium silicate do | 20 |
| Water, to 1000 cc. | |

This composition was sprayed on a steel panel, dried and then fully cured at 350° F. for 15 minutes.

*Example 2*

| | Grams |
|---|---|
| $CrO_3$ | 92 |
| $H_3PO_4$ | 98 |
| $Mg(H_2PO_4)_2 \cdot 3H_2O$ | 272 |
| Sodium silicate | 5 |
| Aluminum powder (spherical, 5–10 micron) | 600 |
| Water, to 1000 cc. | |

The composition, sprayed on a steel panel, was dried and then fully cured at 450° F. for 10 minutes.

*Example 3*

| | Grams |
|---|---|
| $MgCr_2O_7 \cdot 6H_2O$ | 174 |
| $Na_2Cr_2O_7 \cdot 2H_2O$ | 75 |
| MgO | 40 |
| $H_3PO_4$ | 196 |
| Silica aerogel powder (less than .1 micron) | 8 |
| Sodium silicate | 10 |
| Silica (325) mesh | 800 |
| Water, to 1000 cc. | |

The composition coated on a steel panel fully cured at 300° F. for 30 minutes.

*Example 4*

| | Grams |
|---|---|
| $CaCr_2O_7 \cdot 3H_2O$ | 310 |
| $H_3PO_4$ | 294 |
| Alumina gel powder (less than .1 micron) | 20 |
| Sodium silicate | 10 |
| Aluminum powder (5–10 micron) | 800 |
| Water, to 1000 cc. | |

The composition was coated on a steel plate and fully cured at 380° F. for 8 minutes.

*Example 5*

| | | |
|---|---|---|
| $H_3PO_4$ (85% aqueous solution) | cc | 200 |
| $MgCr_2O_7 \cdot 6H_2O$ | grams | 160 |
| MgO | do | 50 |
| $Mg(H_2PO_4)_2 \cdot 3H_2O$ | do | 50 |
| Sodium silicate | do | 30 |
| Molybdenum disulfide (65 micron and less) | do | 100 |
| Water, to 1000 cc. | | |

Cured at 450° for 6 minutes.

All the coatings obtained in accordance with the above examples had excellent adhesion, heat and abrasion resistance etc., and an excellent smooth texture. It will be understood that while the invention has been described in its details specifically with reference to preferred embodiments thereof, changes and modifications can be made all within the full and intend scope of the claims which follow.

I claim:

1. A coating and bonding composition consisting essentially of a dispersion of inorgnaic solid particulate material having a grain size less than 325 mesh in an aqueous solution the solute of which consists essentially of a combination of inorganic compounds from the group consisting of phosphoric acid, chromic acid, molybdic acid and the metal salts of said acids, the combination of said compounds being such as will provide said solution at least .5 mol per liter dissolved phosphate, at least .3 mol per liter dissolved material from the group consisting of chromate, molybdate and mixtures thereof, and at least .2 mol per liter dissolved metal, the solid particulate material being substantially insoluble in said solution and being present in an amount of from 10 to 2000 grams per liter of said solution, said composition additionally having added thereto from 1 to 100 grams per liter water-soluble alkali metal silicate and being heat curable upon drying thereof to a substantially water insoluble material with said solid particulate material being bonded therein.

2. A composition as set forth in claim 1 wherein said combination of inorganic compounds is such that it will provide a dissolved phosphate concentration of about 1 to 4 mols per liter, a dissolved chromate concentration of about .5 to 3 mols per liter, and a dissolved metal concentration of about 1 to 4 mols per liter.

3. A composition as set forth in claim 1 wherein said dissolved metal is magnesium.

4. A composition as set forth in claim 1 wherein said least a portion of said solid particulate material is metal powder.

(References on following page)

References Cited by the Examiner

UNITED STATES PATENTS

| | | |
|---|---|---|
| 2,465,247 | 3/1949 | McBride. |
| 2,529,206 | 11/1950 | Winslow et al. ___ 148—6.16 XR |
| 2,702,425 | 2/1955 | Thompson _____ 106—38.9 |
| 2,928,750 | 3/1960 | Watts _____ 106—38.9 XR |
| 2,995,453 | 8/1961 | Noble et al. ____ 106—38.27 XR |

FOREIGN PATENTS

| | | |
|---|---|---|
| 464,101 | 4/1937 | Great Britain. |
| 475,889 | 11/1937 | Great Britain. |

ALEXANDER H. BRODMERKEL, *Primary Examiner.*

MORRIS LIEBMAN, *Examiner.*